United States Patent [19]
Glaser

[11] 3,940,642
[45] Feb. 24, 1976

[54] STEPPING MOTOR
[76] Inventor: Karl Glaser, 7021 Stetten, Filder, Germany
[22] Filed: Nov. 7, 1974
[21] Appl. No.: 521,909

[52] U.S. Cl.................. 310/20; 310/37; 310/49 R; 335/228
[51] Int. Cl.² ......................................... H02K 7/06
[58] Field of Search.......... 335/228; 310/37, 49, 20, 310/21, 22, 23, 24

[56] References Cited
UNITED STATES PATENTS

| | | | |
|---|---|---|---|
| 3,202,849 | 8/1965 | Neal | 310/37 |
| 3,302,045 | 1/1967 | Dotto | 310/37 |
| 3,320,822 | 5/1967 | Tatom | 335/228 X |
| 3,351,789 | 11/1967 | Bertling | 310/37 |

Primary Examiner—Donovan F. Duggan
Attorney, Agent, or Firm—Mason, Fenwick & Lawrence

[57] ABSTRACT

The invention relates to a stepping motor having at least one electromagnet disposed in a casing, a shaft which is mounted for rotation in the casing and on which is rotationally fixed a rotor which in turn is rotationally fastened to an armature mounted on the shaft for longitudinal sliding and cooperating with the electromagnet, and further having a first ball race concentric to the shaft and fastened to the casing and a second ball race cooperating therewith and mounted for rotation in the casing, balls being disposed between the races and the tracks of the latter being so shaped that an axial force on the rotatable ball race result in a rotary movement of the latter, and further having on the armature a flange which engages behind the rotatable ball race and which carries spur toothing having inclined flanks and cooperating with corresponding spur toothing on the rotatable ball race, and having restoring springs imparting to the rotatable ball race an initial stress oppositely to the direction of rotation produced by the armature, and having a catch device determining the steps.

16 Claims, 10 Drawing Figures

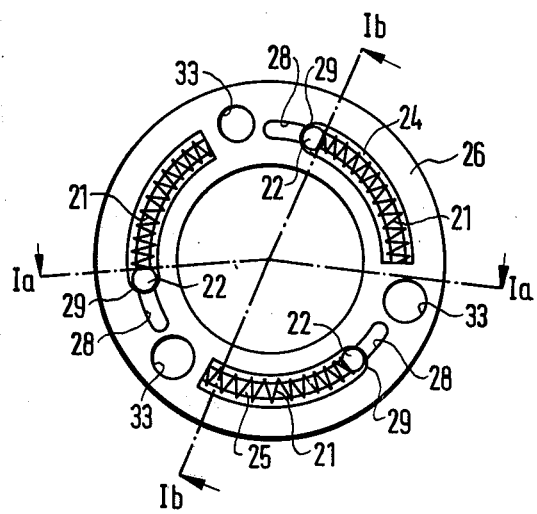
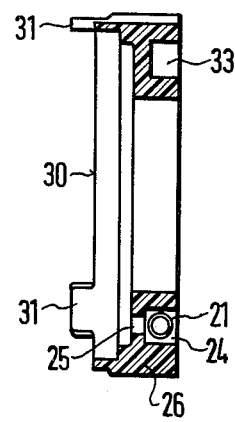
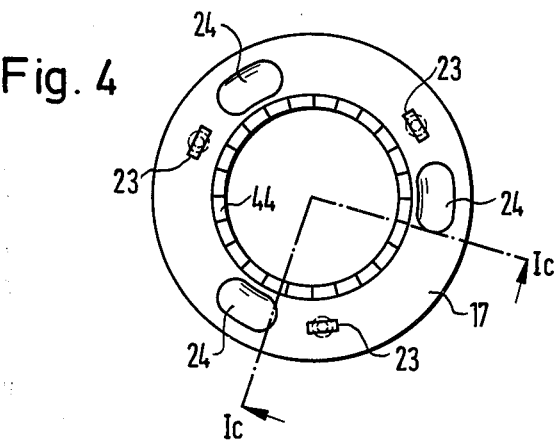
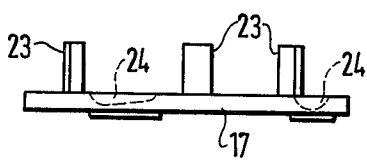

STEPPING MOTOR

A stepping motor of this kind is already known from German Pat. Specification No. 1,299,479. For the stepwise advancing of the motor shaft the axial displacement of the armature in a device for converting an axial movement into a rotary movement is in addition utilised to bring the spur toothing of the armature flange into engagement with a matching toothing on the rotatable ball race, so that the latter is driven one step, overcoming the detaining force of the catch device. If the electromagnet attracting the armature is then deprived of current, the spur toothings are brought out of engagement again and the rotatable ball race is brought back to its starting position by the restoring springs, while the shaft of the stepping motor remains in the position which is now secured by the catch device.

In the known device the springs used for returning the rotatable ball race are tension springs which extend on a straight line between a pin fastened on the casing and a holding device on the ball race.

Since stepping motors of the kind in question must withstand an extremely large number of operations without any defect impairing operational reliability, it is important that there should be no weak spot in the moving parts of the stepping motor. The number of operations which the stepping motor must withstand without being damaged runs into millions.

The object of the invention consequently consists in providing a stepping motor of the kind first mentioned above which still works perfectly even after numerous operations, is of simple and robust construction, and permits economical manufacture, even in series production.

For the solution of this problem the invention provides for the rotatable ball race to be provided, on the opposite side to the ball tracks, with pins which extend axially away from it and which engage in matching peripheral slots in an annular spring casing containing compression springs which at one end bear against the spring casing and at the other end act on the pin of the rotatable ball races. According to the invention, therefore, instead of the tension springs in the known stepping motor use is made of compression springs disposed in suitable peripheral guides in a spring casing. This ensures on the one hand that the restoring force applied to the movable ball race is applied exactly in the tangential direction and that the fracture of the spring need not be feared, because the compression spring provided in accordance with the invention does not require suspension parts sensitive to fracture, as in the case of the known tension spring. Furthermore, the compression spring is protected because it is completely received in a recess.

Both the ball race and the spring casing may be plastics injection mouldings in order to simplify manufacture.

In a preferred embodiment, balls are inserted between the spring and the pin, so that on the one hand the spring tightly fits on the ball and on the other hand perfect transmission of the restoring force from the ball to the pins is ensured.

Another preferred embodiment provides for the peripheral slots to be made slightly narrower in the end region receiving the pins, so that the springs or the end balls lie against the transition step leading to this region. In this way the balls can be relieved of load in the position of rest, thereby in particular substantially simplifying the assembly of the stepping motor of the invention.

It is particularly advantageous for the rotatable ball race to be guided for rotation in the spring casing. This is advantageously achieved by providing the spring casing with a rim and an annular step on which the ball race lies, sufficient clearance being allowed to ensure easy rotatability.

In another embodiment the rotatable ball race is substantially flush, on the ball track side, with the rim of the spring casing.

The pins are expediently disposed as close as possible to the ball tracks, in order that the forces originating from the ball tracks during operation are transmitted on the most direct possible path to the pins and thus to the restoring springs.

Projections, which engage in matching recesses in the ball race fastened to the casing, expediently extend from the rim of the spring casing in the opposite direction to the pins. This ensures automatically and in a simple manner the important correct angular relationship between the two ball races. The projections also preferably engage in matching recesses in the casing, so that a fixed angular relationship is also immediately obtained in relation to the casing.

It is particularly practical for three peripheral slots uniformly distributed over the periphery of the spring casing to be provided. On the one hand this ensures excellent guiding of the rotatable ball race, while on the other hand the spring deflections are of adequate length. Between each two neighbouring peripheral slots it is preferable to provide a hole on the opposite side to the rotatable ball race, pins of a catch ring, which covers the peripheral slots from this side, fitting into these holes. By snapping-on the catch ring it is thus possible for the springs and balls to be held securely in the respective recesses in the spring casing, thus further simplifying production.

On its inner periphery the catch ring is advantageously provided with catch toothing cooperating with a catch ball provided on the rotor. This constitutes a very economical and convenient form of catch device defining the individual step positions of the stepping motor.

The diameters of the holes between the peripheral slots are preferably not all identical, thus ensuring that the catch ring must be mounted in a clearly defined angular position in relation to the spring casing.

It is particularly advantageous for a completely symmetrical stepping motor arrangement, all parts of which are in accordance with one or more of the features indicated above, to be disposed on the opposite side of the catch ring to the spring casing, while however only one common rotor, one common shaft, and one common catch ring are provided. In this manner a stepping motor which can be operated in two opposite directions of rotation is obtained with very economical means. The pins on the two sides of the catch ring are in this case advantageously offet by the angle of one catch period.

According to the invention the pitches of all the toothings should be identical.

The invention is described below by way of example and with reference to the drawing, in which:

FIG. 2 is a plan view of the spring casing used according to the invention, viewed from the pin side;

FIG. 3 is an axial section of the object shown in FIG. 2;

FIG. 4 is a plan view of the rotatable ball race made of plastics material, viewed from the spur toothing side;

FIG. 5 is a side view of the object shown in FIG. 4;

Only the upper half of a stepping motor adapted to be operated on two sides is described with reference to FIG. 1. Apart from angular offsetting about the axis of rotation 13, the bottom half is completely symmetrical to the axis of symmetry 40.

Figure 1:
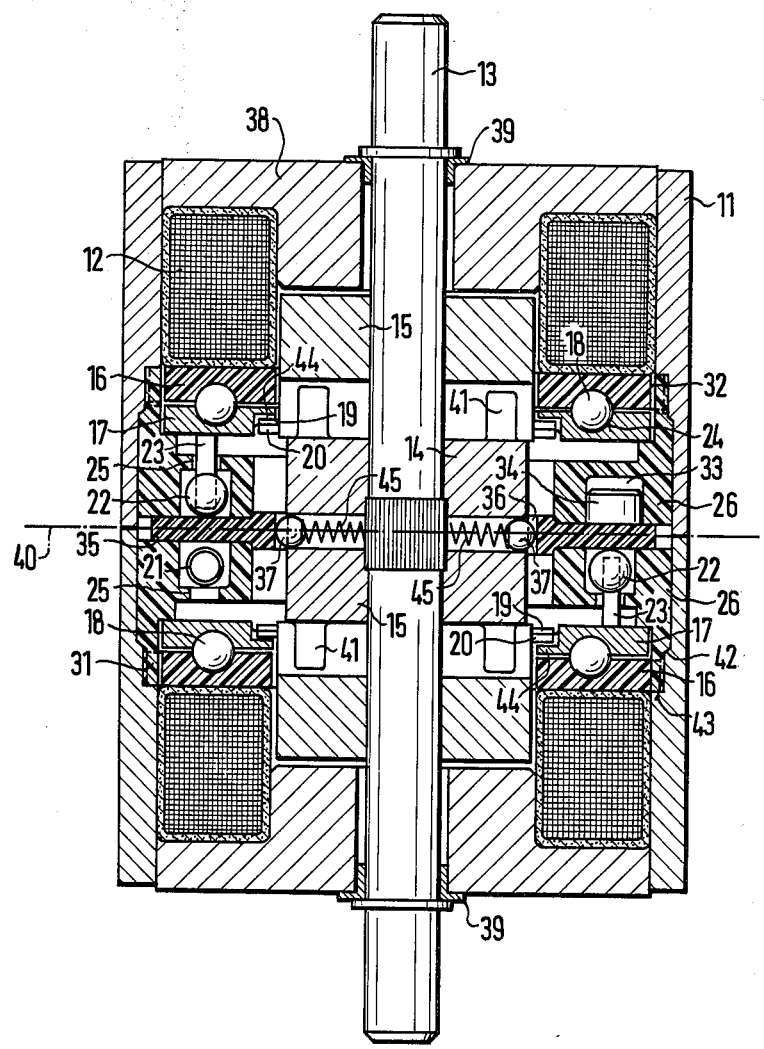
FIG. 1 is an axial section of a preferred form of construction of a stepping motor according to the invention.

According to FIG. 1, a cylindrical casing 11 contains an electromagnet 12 which has an annular shape and is fastened in position inside the casing 11 by a magnet-core 38. Along the axis of the casing 11 extends the stepping motor shaft 13, which is mounted in bearings 39 in the end cover 38 so as to be rotatable but axially immovable.

Half-way along the shaft 13 is mounted a rotor 14 which is rotationally fastened and provided with axial pins 41 which engage in corresponding apertures in the armature 15 so as to be axially slidable but immovable in the peripheral direction. In this way a rotationally fixed connection is made between the rotor 14 and the armature 15, while however a certain axial movability between these two parts is still possible.

Figure 8:
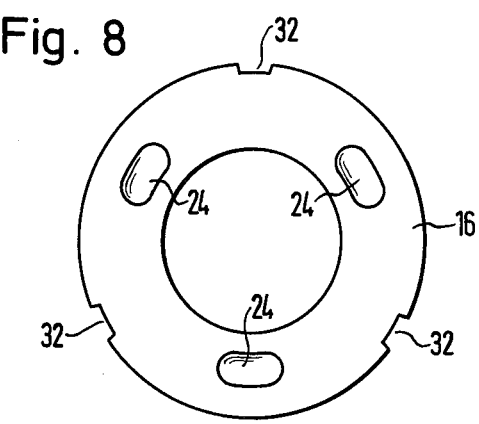
FIG. 8 is a plan view of the ball race fastened to the casing, which is used in the object of the invention.

According to the invention, the casing 11 is provided on its inner side with two annular steps 42,43, the ball race 16 (FIG. 8) fastened to the casing lying against the upper annular step 43. On its periphery the race 16 is provided with recesses 32, and it also carries three ball tracks 24. Projections provided internally on the casing project to a certain height into the recesses 32, in order to hold the ball race in a defined position.

Facing the ball race fastened to the casing is disposed a rotatable ball race 17, which as shown in FIG. 4 likewise has ball tracks 24, while the driving balls 18 extend between the ball tracks 24 of the two races 16 and 17. The movable ball race 17 is guided for rotation in a spring casing 26 (FIGS. 2 and 3), which bears against the lower annular step 42 of the casing 11 and has axially extending projections 31 engaging in the recesses 32, in order to ensure an accurate angular relationship between the spring casing 26 and the ball race 16 fastened to the casing.

Figure 10:
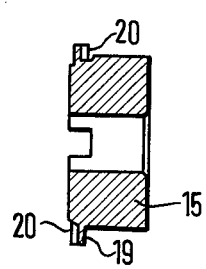
Figure 9:
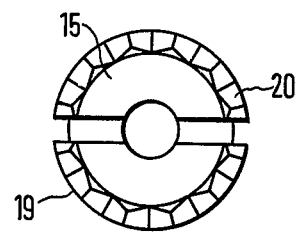
FIG. 9 is an end view of the armature used in the stepping motor of the invention, and FIG. 10 an axial section of the object shown in FIG. 9.

On its inner periphery the rotary ball race 17 has spur toothing 44 which cooperates with matching spur toothing 20 on a flange 19 on the armature 15 (FIGS. 9 and 10). In the position of rest the two toothings are out of engagement while they come into engagement with one another when the armature 15 is attracted by the electromagnet 12.

As shown in FIGS. 2 and 3, three peripheral slots 25, in which compression springs 21 with end balls 22 are accommodated, are provided in the spring casing 26. At one end the peripheral slots 25 have a step 29, from which they merge into end regions 28 into which the balls 22 cannot fit. The end regions 28 serve to receive pins 23, which according to the invention are disposed in the axial direction on the rotatable ball races 17.

The thickness of the movable ball race shown in FIGS. 4 and 5 is so selected that after insertion into the spring casing shown in FIGS. 2 and 3 it just extends to the edge 30 of the spring casing.

The ball races 16 and 17 are shown in FIG. 1 in section along the line Ic - Ic in FIG. 4. The angular offsetting of the ball races 24 and of the pins 23, as shown in FIG. 4, is not taken into account in FIG. 1 for reasons of clear graphic representation. The spring casing 26 is shown in the top half of FIG. 1 in a section on the line I$a$ — I$a$ in FIG. 2, and in the bottom half of FIG. 1 in a section on the line I$b$ — I$b$ in FIG. 2.

Figure 6:
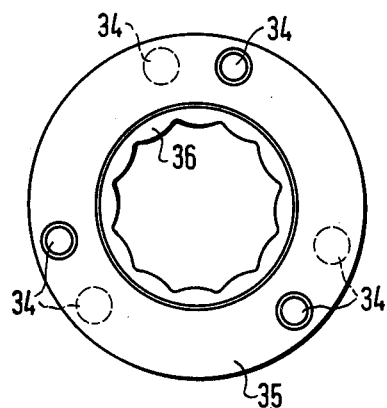
FIG. 6 is a plan view of the catch ring used according to the invention.
Figure 7:
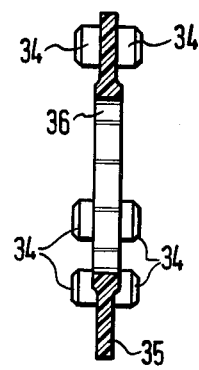
FIG. 7 is an axial section of the catch ring shown in FIG. 6.

As shown in FIGS. 2 and 3, holes 23 are provided in the spring casing 26 between the peripheral slots 25, their diameter being so selected that the pins 34 of a catch ring shown in FIGS. 6 and 7 snap into these holes. The catch ring 35 has an internal catch toothing 36 cooperating with a catch ball 37, which projects slighlty out of a channel provided with a spring 45 and formed in the rotor 14.

The mode of operation of the stepping motor of the invention is as follows. When the armature 15 is attracted through the energisation of the electromagnet 12, the spur toothings 20,44 come into engagement. Because of the action of the ball races 24 and of the balls 18 the axial movement of the armature 15 is now converted into a rotary movement, which the armature 15 must follow because of its coupling to the ball race 17. The catch ball 37 thus comes into the next tooth of the catch toothing 36 of the catch ring 35.

If the current of the electromagnet is now switched off, the compression springs 21 compressed by the pins 23 exert a restoring moment on the race 17, which the latter can now follow because after the current has been switched off the meshing of the spur toothings 20 and 44 is released. The movable ball race 17 thus moves back to its starting position, while the shaft 13 remains in the position determined by the catch ring 35. Through operation of the electromagnet, which is symmetrical to the axis of symmetry 40, the shaft 13 would be rotated in the opposite direction.

The two halves of the casing 11 can be held together in a simple manner by means of a clip or the like.

The preferred stepping angle in the stepping motor of the invention amounts to 30°.

It is a particular advantage of the stepping motor of the invention that because the correct angular relationship is automatically ensured it is not necessary for the two halves of the stepping motor to be accurately aligned angularly before assembly.

I claim:

1. A stepping motor comprising a casing, at least one electromagnet disposed in the casing, a shaft which is mounted for rotation in the casing, a rotor fixed to the shaft, an armature rotationally fastened to the rotor and mounted on the shaft for longitudinal sliding and cooperating with the electromagnet, a first ball race concentric to the shaft and fastened to the casing, a second ball race cooperating with the first ball race and mounted for rotation in the casing, balls disposed between the races, the tracks of the races being so shaped that an axial force on the rotatable second ball race results in a rotary movement of the latter, a flange on the armature which engages behind the rotatable ball race and which carries spur teeth having inclined flanks and cooperating with corresponding spur teeth on the rotatable second ball race, restoring springs imparting to the rotatable second ball race an initial force opposite in direction to the rotation produced by the armature, a catch device for determining the steps, pins on the side of the rotatable ball race opposite the ball tracks, said pins extending axially away from the race, and an annular spring casing having peripheral slots which match with and engage said pins with compression springs positioned in the slot, said springs are supported at one end against the spring casing and at the other end act on the pins of the rotatable ball race.

2. A stepping motor according to claim 1, characterised in that balls (22) are inserted between the spring (21) and pin (23).

3. A stepping motor according to claim 2, characterised in that the peripheral slots (25) are made slightly narrower in the end region (28) receiving the pins (23), so that the springs (21) or the end balls (22) bear against the transition step (29) leading to this region (28).

4. A stepping motor according to claim 1, characterised in that the rotatable ball race (17) is guided for rotation in the spring casing (26).

5. A stepping motor according to claim 4, characterised in that on the side where the ball tracks (24) are provided the rotatable ball race (17) is substantially flush with the edge (30) of the spring casing (26) when in the position of rest.

6. A stepping motor according to claim 1, characterised in that the pins (23) are disposed as close as possible to the ball tracks (24).

7. A stepping motor according to claim 1, characterised in that from the edge (30) of the spring casing (26) projections (31) extend in the opposite direction to the pins (23) and engage in matching recesses (32) in the ball race (16) fastened to the casing.

8. A stepping motor according to claim 7, characterised in that the projections (31) also engage in matching recesses in the casing (11).

9. A stepping motor according to claim 1, characterized in that three peripheral slots (25) uniformly distributed on the periphery of the spring casing (26) are provided.

10. A stepping motor according to claim 9, characterized in that between two neighbouring peripheral slots (25) on the side remote from the rotatable ball race (17) there is provided in each case a blind hole (33) in the spring casing (26), into which holes fit the pins (34) of a catch ring (35) which covers the peripheral slot (35) from the said side.

11. A stepping motor according to claim 10, characterised in that on its outer periphery the catch ring (35) has a catch toothing (36) which cooperates with a catch ball (37) provided on the rotor (14).

12. A stepping motor according to one of claim 10, characterised in that the diameters of the holes (33) between the peripheral slots (25) are not all the same.

13. A stepping motor according to claim 10, characterised in that on the side of the catch ring (35) which is remote from the spring casing (26) there is disposed a completely symmetrical stepping motor arrangement having only one common rotor (14), one common shaft (13), and one common catch ring (35).

14. A stepping motor according to claim 13, characterised in that the pins (34) on the two sides of the catch ring (34) are offset by the angle of one catch period.

15. A stepping motor according to claim 1, characterised in that the pitches of all the toothings are the same.

16. A stepping motor according to claim 1, characterised in that on the opposite side to the rotatable ball race (17), the peripheral slot (25) is exactly so wide that the pins (23) pass through with slight clearance and that it thereupon widens stepwise in such a manner that the balls (22) and the spring (21) fit thereinto with slight clearance.

* * * * *